(12) United States Patent
Ghosh et al.

(10) Patent No.: US 7,208,189 B2
(45) Date of Patent: Apr. 24, 2007

(54) LOW SODIUM SALT OF BOTANIC ORIGIN

(75) Inventors: Pushpito Kumar Ghosh, Gujarat (IN); Kalpana Haresh Mody, Gujarat (IN); Muppala Parandhami Reddy, Gujarat (IN); Jinalal Shambhubhai Patolia, Gujarat (IN); Karuppanan Eswaran, Gujarat (IN); Rajul Ashvinbhai Shah, Gujarat (IN); Bhargav Kaushikbhai Barot, Gujarat (IN); Mahesh Ramniklal Gandhi, Gujarat (IN); Aditya Shantibhai Mehta, Gujarat (IN); Ajoy Muralidharbhai Bhatt, Gujarat (IN); Alamuru Venkata Rami Reddy, Gujarat (IN)

(73) Assignee: Council of Scientific and Industrial Research, New Dehli (IN)

( * ) Notice: Subject to any disclaimer, the term of this patent is extended or adjusted under 35 U.S.C. 154(b) by 287 days.

(21) Appl. No.: 10/819,001

(22) Filed: Apr. 6, 2004

(65) Prior Publication Data

US 2005/0220975 A1    Oct. 6, 2005

(51) Int. Cl.
*A23L 1/015* (2006.01)
*A23L 1/22* (2006.01)

(52) U.S. Cl. .................. 426/649; 426/74; 426/465; 426/472; 426/481; 426/521; 426/615

(58) Field of Classification Search ............... 426/74, 426/649, 615, 465, 472, 481, 521
See application file for complete search history.

(56) References Cited

U.S. PATENT DOCUMENTS

| | | | |
|---|---|---|---|
| 2,471,144 A | 5/1949 | Davy | |
| 4,473,595 A | 9/1984 | Rood et al. | |
| 5,098,723 A | 3/1992 | DuBois et al. | |
| 5,853,792 A | 12/1998 | Zolotov et al. | |
| 2001/0021408 A1 | 9/2001 | Kim | |
| 2003/0185954 A1 | 10/2003 | Ghosh et al. | |
| 2003/0185955 A1 | 10/2003 | Ghosh et al. | |
| 2004/0031302 A1 | 2/2004 | Eswaran et al. | |

FOREIGN PATENT DOCUMENTS

| | | | |
|---|---|---|---|
| CN | 1217196 | | 5/1999 |
| CN | 1271541 | | 11/2000 |
| CN | 1358456 | | 7/2002 |
| CN | 1387794 | | 1/2003 |
| EP | 0809942 | | 12/1997 |
| JP | 04108357 | * | 4/1992 |
| JP | 10136932 | | 5/1998 |
| JP | 10295319 | | 11/1998 |
| JP | 10327799 | | 12/1998 |
| JP | 2000004823 | | 1/2000 |
| WO | WO 85/00958 | | 3/1985 |
| WO | WO 03/064323 A1 | | 8/2003 |
| WO | WO 03/079817 A1 | | 10/2003 |

* cited by examiner

*Primary Examiner*—Helen Pratt
(74) *Attorney, Agent, or Firm*—RatnerPrestia

(57) ABSTRACT

The invention describes the cost effective process for the preparation of a mixture of salts having low sodium salt (health salt) contain and exclusively derived from vegetable sources which have desired sodium chloride: potassium chloride ratio and traces of micronutrients including iodine, said salt is white in color and free flowing in nature.

15 Claims, No Drawings

LOW SODIUM SALT OF BOTANIC ORIGIN

FIELD OF INVENTION

The present invention relates to a mixture of homogeneous salts having low sodium salt content of botanic origin and a process thereof. More particularly, the invention relates to preparation of low sodium salt by blending crude sodium chloride and potassium chloride salts of plant by-products and then processing under aqueous conditions to obtain low sodium salt of desired composition in cost-effective manner. Low sodium salt is a mixture of sodium chloride and potassium chloride and is useful for those persons who have been advised to eat less common salt because of medical problems like hypertension.

BACKGROUND OF THE INVENTION

It is well known that in certain cardiac and renal conditions, particularly when associated with edema, hypertension, arteriosclerosis, pregnancy complications and epilepsy, the diet must be relatively salt free to avoid further damage and to ameliorate these conditions to the degree that control of diet can do. It is further known that the deleterious action of common table salt is due to sodium content thereof, since it is the sodium in the form of sodium ions, which must be avoided. Further, the tendency of the sodium content in the diet to cause an accumulation of fluids with a corresponding increase in the weight of the body tissues has underscored the importance of reducing the sodium intake in diets.

It is also known that potassium salt, a mineral present in many fruits, vegetables and legumes, protects against high blood pressure. Presence of potassium in low sodium salt inhibits sodium-induced hypertension. Reference may be made to "The Heinz Handbook of Nutrition" by Benzamin T Burton, published for H J Heinz co., by McGrew Hill Book Co. Second Edition, Page 132–133, wherein, it is mentioned that the dietary need for potassium roughly equals to that of sodium.

Salt is an excellent transporter for the supply of any nutrient supplement including potassium and micronutrients such as magnesium, calcium, zinc, iron and copper since people are consuming salt daily to improve the taste of food, though in a very limited quantity; an important example being fortification of salt with iodine and iron for the control of goiter and anemia respectively (M G Venkatesh Mannar, S Jaipal and C S Pandya, Proceedings of sixth international congress, Seoul, 1989)

Many attempts have been made to provide salty tasting compositions as a substitute for table salt, which would give similar seasoning effect, and which is comprised of substantially reduced quantities of sodium chloride.

In the fields of chemical technology, the recovery of low sodium salt from bittern, a by-product of salt industry, has gained importance because of its requirement for the patients suffering from heart problem and blood pressure and also for its nutritive value. Most typically, the pure salts are mixed together to produce low sodium salt but the prior art has also revealed that it is possible to directly produce low sodium salt by a process that involves chemical treatment of bittern with $CaCl_2$ to separate sulfate; concentrating bittern to produce mixture of salt and carnallite and finally processing the mixture to produce low sodium salt.

Reference may be made to Biale and Zolotov, (EP0809942, dated Mar. 12, 1997 and U.S. Pat. No. 5,853,792; 29 Dec. 1998), entitled "Low sodium edible salt mixture" and "Low sodium edible salt composition and process for its preparation", respectively, wherein composition of low sodium edible salt is described which comprises, based on dry weight of ingredients, 0–50% sodium chloride, 45–99.5% potassium chloride and at least 0.5% a additives, which comprise at least one edible nucleotide monophosphate salt and at least one member other than said nucleotide monophosphate salt selected from the group consisting of low organic acid, low organic acid salt, phosphoric acid, phosphate salt, a magnesium salt, sugar and burnt sugar. The additives have the effect of countering the bitter taste of potassium chloride. However, the drawback of this process is that the product is obtained by simple physical mixing of the ingredients and hence difficult to get a homogenous mixture.

Reference may be made to the patent of Rood Robert P. and Tilkian Sarko M. (WO8500958, 14 Mar. 1985, U.S. Pat. No. 4,473,595 dated 25 Sep. 1984)), entitled "Low sodium salt substitute" wherein a process for low sodium composition is described as a substitute for common table salt and as a magnesium dietary supplement comprised of about 40–50% of sodium chloride, 25–35% of potassium chloride and 15–25% of magnesium salt including magnesium sulfate and magnesium chloride. Presence of magnesium overcomes potassium-generated bitterness or aftertaste while providing desirable magnesium dietary supplementation. However, the drawback of this process is that the product is obtained by simple physical mixing of the ingredients and hence difficult to obtain a true homogeneous solid mixture.

Reference may be made to Vohra et al (WO 03064323 dated 7 Aug. 2003) entitled "A process for recovery of low sodium salt from bittern" who disclosed the preparation of a mixture of sodium chloride and potassium chloride containing other nutrients such as magnesium and calcium by a natural process from brine/bittern, which is a by product of salt industry. The main drawback of this process is that the salt does not contain essential micronutrients such as iodine, zinc, copper, iron and manganese.

Reference may be made to Alves de Lima et al. in patent No. BR 9806380 A, 12 Sep. 2000, entitled "Production of dietetic salt by mixing", wherein it is stated that low sodium dietetic salt is produced by mixing sea salt with potassium chloride, potassium iodate and sodium aluminium silicate, thereby mixing 4 parts of sodium chloride with 6 parts of potassium chloride. The drawback of this process is that one has to separately procure sodium chloride and potassium chloride and blend them together in different proportion in order to obtain low sodium salt of different sodium chloride: potassium chloride ratio, so as to make a solid mixture. With this method, it is difficult to prepare a truly solid homogeneous mixture. Moreover, in this patent, no mention is made about the free flowing characteristics of the product and presence of important micronutrients required for metabolic processes.

Reference may be made to Shuqing Wang in patent No. CN 1271541A, November 2000, entitled "Multi-element low sodium nutritive salt", who disclosed the preparation of low sodium nutritive salt by crystallizing salt from saturated brine under vacuum. The salt is then mixed uniformly with salts such as potassium chloride and $MgSO_4.7H_2O$, followed by mixing with $KIO_3$ and $Na_2SeO_3$ solutions, drying and finally mixing with active Ca and Zn lactate. The drawback of this process is that apart from the difficulty of mixing various constituents in a homogeneous solid mixture, salt is to be crystallized from hot saturated brine involving high energy consumption thereby increasing the cost of production.

Reference may be made to DuBois et al, (March, 1992) in U.S. Pat. No. 5,098,723 entitled "Low sodium salt composition and method of preparing", wherein, low sodium salt composition and method for its preparation is given. Here, sodium chloride is combined with a non-gritty bulking agent, and optionally a binder, to form a salt composition suitable for sprinkling onto prepared foods. This provided a composition with a salty flavor with the delivery of less sodium. The drawback of this process is that additives reduce sodium content and not by increasing potassium chloride content which is required to reduce sodium-induced hypertension.

Reference may be made to U.S. Pat. No. 2,471,144 issued to Davy E D (1949), entitled "salt substitute", where in, a sodium free preparation containing chlorides of potassium and ammonium as the primary saline constituents (70-95% of the total ingredients) with the addition of small amount of calcium and magnesium cations and phosphate and citrate anions is proposed as a salt substitute. These ions are included in the preparation to smooth out the taste to make the preparation taste similar to that of sodium chloride. The drawback of this process is that the product is obtained by mixing the ingredients physically and hence difficult to obtain truly homogeneous mixture.

Reference may be made to Chinese patents by Zheng Haibin (CN1358456 dated 17 Jul. 2002) and Zheng Haibin & Yue Jing (CN1387794 dated Jan. 1, 2003) entitled "Health care table salt" and "Health table salt" respectively. The first patent describes edible health salts which are prepared by mixing sodium chloride, calcium carbonate, sodium selenite, magnesium sulfate and potassium iodate with several trace elements. This product possesses obvious health care effect. The latter patent describes the product which is prepared by mixing sodium chloride, various amino acids, peptide substances, vitamin B family, polysaccharide, antioxidant, nucleic acid seasoning, potassium chloride, magnesium salt, selenium salt and potassium iodide. This product effectively prevents various diseases. However, the drawback of this process is the product is obtained by simple physical mixing of the ingredients which does not give a truly solid homogeneous mixture. Moreover, the claimed product is not a low sodium salt and does not contain essential micronutrients.

Reference may be made to Korean, Japanese and US patents by Kim Won-Dae entitled "Vegetable salt preparation method" (KR 2001083036 dated 31 Aug. 2001, JP2001292725 and US2001021408) in which a method for the preparation of vegetable salt containing high mineral content and low heavy metal content is described. To obtain this, halophilic plants such as *Salicornia europaea, Suaeda japonica, Suaeda maritime* and *Aster tripolium* are used, which are subjected to hydrothermal extraction. The extractb obtained is dried and sequentially passed through ashing at 150–250° C. for 30 min, at 500° C. for 2 h and at 700° C. for more than 2 h, pulverized to obtain salt granules. The main drawback of this process is that whole plant is used for the preparation of salt. Moreover, its process is uneconomical due to hydrothermal extraction and ashing of the biomass at 700° C. Also the product described is not a low sodium salt.

Reference may be made to Ghosh et al, WO03079817 dated 2 Oct. 2003 and US2003185954 dated 2 Oct. 2003) entitled "Preparation of nutrient rich salt from plant origin" and (US2003185955 dated Oct. 2, 2003) entitled "Nutritious salt formulations of plant origin and process for the preparation thereof", wherein, the preparation of nutrient rich salt from high salt accumulating and edible oil-bearing salt tolerant plant, *Salicornia brachiata*, is described in a way that allows simultaneous recovery of both salt and oil. By regularly irrigating the plants with seawater and occasionally with seawater enriched with salt bitterns and/or other types of waste/by-products containing essential nutrients, level of such nutrients in the salt is also raised. However, the salt obtained through this process is in the range of 1 to 20% of potassium chloride and is in the strict sense not a low sodium salt of adequate therapeutic value.

Reference may be made to two Korean patents by Im John Hwan entitled "Production of seaweed salt" (KR2003024737 dated 26 Mar. 2003) and Choi Byung Soo entitled "Method for manufacturing tasty salt by brown seaweeds (sea tangle)" (KR2002062878 dated 31 Jul. 2002) in which seaweeds are used for manufacturing salt. However, the product claimed is obtained from brown algae and is not a low sodium salt of medicinal value.

Reference may be made to Wu Xixin (CN1217196 dated 26 May 1999 entitled "Edible salt substitute for treating kidney disease", wherein, preparation of sodium free or low sodium, edible salt substitute is described for curing kidney disease. This is made up by using Chinese medicinal materials and chemical salt through the process of extraction and refining. The drawback of this process is that plant materials are mixed with chemically derived salt so as to obtain desired product and hence can not be considered a product entirely of vegetable origin.

Reference may be made to a Japanese patent by Okabe Mitsutoshi entitled "Production of vegetable/alga salt" (JP10327799 dated 15 Dec. 1998), where in a process has been provided for the production of salt, effective for decreasing the amount of salt necessary for salting and capable of combining the palatability such as the flavor and the saltiness with the source of deliciousness by combining the salting preservation potency of table salt with the antiseptic preservation potency of vegetables, beneficial plants, seaweeds and grasses. The drawback of this process is that components from vegetable origin are mixed with table salt to obtain the desired product, which may not give truly homogeneous solid mixture.

Reference may be made to a Japanese patent by Yamahara Joji (JP2000004823 dated 11Jan. 2000) entitled "Plant derived mineral salt" wherein, a process has been described to obtain an inexpensive plant-derived mineral salt by ashing an ash-rich plant followed by subjecting the resultant ash to extraction with seawater and/or seawater-derived aqueous solvent at pH 6–8. The ash-rich plant used is pref. *Shorea robusta*, red algae or brown algae. In the above process, the liquid extract as a result of extraction with seawater is subjected to fiitration followed by concentration under reduced pressures and then boiling down to afford the objective product, which contains mineral salts such as of magnesium other than potassium at several hundred times as compared to ordinary commercial common salt, but is half the sodium content of the common salt. However, the drawback of this process is that seawater with defined pH is used for the extraction and concentration is done under reduced pressure which makes the process uneconomical. Moreover, the plant is used entirely for recovery of salt which may not turn out to be economically attractive.

Reference may be made to a Japanese Patent of Setsuko (JP10136932 dated 26 May 1998) entitled "Health Salt" where in a process for the preparation of health salt is described in which natural salt and burnt seaweed salt are the main ingredients which are supplemented with small quantity of citric acid, maltose, cane sugar or sucrose and enzymes like maltase and invertase. The salt is recovered from the solution after ionization of mineral components using strong magnetic field. The drawback of this process is that the product is obtained by mixing table salt with seaweed ash. This may not give truly homogeneous solid mixture. Moreover, recovery of salt is done using strong magnetic field for ionization of mineral components which makes the process uneconomical.

Reference may be made to a Japanese patent by Hiroshima Nobuki entitled "Table salt containing vegetable powder and vitamin C" (JP10295319 dated 10 Nov. 1998) in which the taste of table salt is improved by mixing an adequate amount of vegetable powder of natural acerola, a rose hip, a powdered green tea or a mugwort and vitamin C from citrus fruit like sour orange or a lemon. The amount of mixed powder is preferably 0.05 g based on 1 kg of table salt. However, the claimed product is a mixture of table salt and vegetable powder. Thus this product is not derived entirely from vegetable source. Moreover, the said product is not a low sodium salt.

Reference may be made to the red seaweed, *Eucheuma striatum* (more popularly known as *Eucheuma*) which is known as a source of κ-carrageenan. *Eucheuma* preparation is also used as foliar spray for improving flowering and growth of crops and also as edible seaweed by the name of *Tosaka nori* (V J Chapman and D J Chapman in their book, "Seaweeds and their uses", Chapman and Hall, London and New York, 1980, Chapter 2, pp 30–61). Reference may also be made to the article by H. J. Bixler entitled "Recent Developments in manufacturing and marketing carrageenan" in *Hydrobiologia,* 326/327, 35–57, 1996, wherein it is mentioned that "there is a long history of southeast Asians eating unprocessed *Eucheuma* without any epidemiological evidence of health problems".

Reference may be made to Q. Hurado-Ponce (Botanica Marina 38, 137, 1995) who has reported that *Eucheuma striatum* was harvested, washed and sun/oven dried for recovery of carrageenan. No reference is made to recover the adhering salt from the dried seaweed as a source of potassium chloride.

Reference may be made to K Eswaran et al entitled "Method for production of carrageenan and liquid fertilizer from fresh seaweeds" (U.S. application Ser. No. 10/222,977; International Patent No. PCT/IB 02/04112, International filing date: Oct. 8, 2002) in which an integrated method is developed to utilize fresh biomass of *Eucheuma striatum* to a maximum extent, for the recovery of liquid fertilizer (sap) by crushing the weeds while the residue is a superior raw material for the extraction of κ-carrageenan. Though it is mentioned that the plant sap is rich in potassium and that as-dried weed has high potassium chloride content useful as potassic manure, no attempt was made to utilize the potassium chloride for preparation of low sodium salt.

OBJECTIVE OF INVENTION

The main objective of the present invention is to provide a process for preparing a mixture of low sodium salt content, derived from Botanic origin, said process comprising the steps of:

a) harvesting *Eucheuma* plants/sea weeds obtained from sea and drying the same for obtaining a predetermined moisture level, b) crushing/hammering the dried *Eucheuma* plants/sea weeds of step (a) at a room temperature for a period in the range of 10 to 30 minutes and separating adhered crude salt contains 90–99% by w/w potassium chloride and traces of micronutrients, c) harvesting *Salicornia* plants/sea weeds obtained from sea, removing oil bearing seeds and drying the same to obtain predetermined moisture content, d) crushing the dried *Salicornia* plants of step (c) at a room temperature and separating the crude salt contains 20 to 60% by w/w sodium chloride and traces of micronutrients, e) mixing the crude salt obtained in step (d) with the crude salt of step (b) in a ratio in the range of 1:5 to 5:1, f) co-incinerating the mixture obtained in step (e) at a temperature in the range 300° C. to 600° C. for a period of 1–10 h to obtain herbal crude low sodium salt devoid of organic matter.

g) dissolving the incinerated mixture obtained in step (f) in water for preparing a salt solution, h) filtering the salt solution of step (g) by known techniques and concentrating the solution to obtain the mixture of salts of vegetable origin and content low sodium salt.

Another objective of the present invention is to provide a homogeneous mixture of low sodium salt content, free flowing and derived from Botanical source comprises:

35 to 80% by w/w potassium chloride
20 to 30% by w/w sodium chloride
0.02 to 0.5% by w/w calcium
0.02 to 1.2% by w/w magnesium
0.0005 to 0.0007% by w/w iodine
the rest are nutrients.

Yet another object of the present invention is to prepare low sodium salt containing essential micronutrients such as calcium, magnesium, zinc, iron and iodine without fortification.

Yet another object of the present invention is to prepare refined low sodium salt free from insoluble impurities.

Yet another object of the present invention is to provide low sodium salt that is odorless, white in appearance and free flow in nature.

Another object of the present invention is to provide a low sodium salt containing biomass of halophytes and potassium chloride accumulating seaweeds for the preparation of low sodium salt of botanic origin.

Still another object of the present invention is to utilize the waste biomass of *Salicornia brachiata* (a halophytic plant) as the source of sodium chloride , which grow in the inter-tidal area near the sea, for the preparation of low sodium salt.

Yet another object of the present invention is to utilize *Eucheuma* (a red seaweed) that grow in the sea, as the source of potassium chloride for the preparation of low sodium salt.

Yet another object of the present invention is to utilize adhering salt of dried *Eucheuma*, a waste material, as the source of potassium chloride, Yet another object of the present invention is to obtain low sodium salt of different sodium chloride:potassium chloride ratios from the residual biomass of *Salicornia brachiata* and adhering salt from sun-dried *Eucheuma* species.

Yet another object of the present invention is to utilize stored energy in dried *Salicornia* biomass to effect incineration of both the raw materials to yield crude low sodium salt without any external input of energy.

Yet another object of the present invention is to provide a low sodium salt without affecting the yield and quality of the main products viz. oil in the case of *Salicornia* and κ-carrageenan in case of *Eucheuma.*

Yet another object of the present invention is to provide low sodium salt with different sodium chloride:potassium chloride ratios by using knowledge of Invariant Points of sodium chloride-potassium chloride-H$_2$O system as a function of temperature.

Yet another object of the present invention is to maximize economic returns through cultivation of both the plants by obtaining an additional product by utilizing and processing both the waste materials in an integral form to obtain value-added low sodium salt.

SUMMARY OF THE PRESENT INVENTION

Although vegetable salt such as that obtained from *Salicornia brachiata* has small quantities of potassium chloride, the present invention discloses the preparation of a low sodium salt of vegetable origin with any desired amount (10–90%) of potassium chloride in the composition. Besides the obvious attraction of being of vegetable origin, which would be preferred by many people including strict vegetarians, the low sodium salt is heat, sterilized and contains small quantities (5–10 ppm) of iodine and some other essential micronutrients. The utility of the invention stems from the fact that cultivation of plants such as *Salicornia* and *Eucheuma* becomes more economically attractive in view of the utilization of by-products of these plants for preparation of a value added product, namely low sodium salt of vegetable origin.

Accordingly, the present invention provides a process for the preparation of low sodium salt of botanic origin which comprises of (i) adding appropriate quantity of potassium chloride-containing crude salt from *Eucheuma* into the residual *Salicornia* biomass after removal of oil-bearing seeds and subjecting it to incineration by making use of the high lignin content and other organic matter in it to sustain ignition without external energy input; (ii) repeated leaching of salt from the residual ash with appropriate quantity of water; (iii) combining the filtrates from step (ii) above; (iv) concentrating the salt solution in an evaporator, filtering and drying salt in oven.

DETAIL DESCRIPTION OF THE INVENTION

Accordingly, the present invention relates a process for preparing, a homogeneous and low content sodium salt derived from Botonic origin, said process comprising the steps of:
a. harvesting *Eucheuma* plants/sea weeds obtained from sea and drying the same for obtaining a predetermined moisture level,
b. crushing/hammering the dried *Eucheuma* plants/sea weeds of step (a) at a room temperature for a period in the range of 10 to 30 minutes and separating adhered crude salt contains 90–99% by w/w potassium chloride and traces of micronutrients,
c. harvesting *Salicornia* plants/sea weeds obtained from sea, removing oil bearing seeds and drying the same to obtain predetermined moisture content,
d. crushing the dried *Salicornia* plants of step (c) at a room temperature and separating the crude salt contains 20 to 60% by w/w sodium chloride and traces of micronutrients,
e. mixing the crude salt obtained in step (d) with the crude salt of step (b) in a ratio in the range of 1:4 to 6:7,
f. co-incinerating the mixture obtained in step (e) at a temperature in the range 300° C. to 600° C. for a period of 1–10 h to obtain herbal crude low sodium salt devoid of organic matter,
g. dissolving the incinerated mixture obtained in step (f) in water for preparing a salt solution,
h. filtering the salt solution of step (g) by known techniques and concentrating the solution to obtain a mixture of salt of vegetable origin and contain low sodium salt.

An embodiment of the present invention relates to a process wherein in step (a), the *Eucheuma* plants used for harvesting are 45 to 90 days old.

Another embodiment of the present invention relates to a process wherein in step (a), the drying is carried out for maintaining moisture level 20 to 25% in plant.

Yet another embodiment of the present invention relates to a process wherein in step (b), the crude salt comprises 30 to 80% dissolved salt, 90 to 99% potassium chloride, 0.1 to 2% sodium chloride and nutrients.

Yet another embodiment of the present invention relates to a process wherein in step (c), the *Salicornia* plants used for harvesting are 45 to 90 days old.

Yet another embodiment of the present invention relates to a process wherein in step (d), the micronutrients are calcium, magnesium, iron, copper and zinc directly recovered from the plant source.

Yet another embodiment of the present invention relates to a process wherein in step (e), the mixing the crude salt of step (d) with the crude salt of step (b) in a ratio in the range of 1:4 to 6:7.

Yet another embodiment of the present invention relates to a process wherein in step (g), the dissolution of incinerated mixture in water is carried out under continuous stirring for a period in the range of 30 minute to 2 hours and at a temperature in the range of 10° C. to 110° C. to obtain 15 to 35% of salt concentration.

Yet another embodiment of the present invention relates to a process wherein in step (h), thus obtained salt contains 35 to 85% by w/w potassium chloride, 20 to 30% by w/w sodium chloride, 0.02 to 0.5% calcium, 0.02 to 1.2% by w/w magnesium, 5 to 10 ppm of iodine, and traces of zinc, iron and copper.

Yet another embodiment of the present invention relates to a process wherein in step (h), concentration of solution is carried out in an evaporator.

Yet another embodiment of the present invention relates to a process wherein thus obtained salt contains iodine in the range of 5 to 7 ppm.

Yet another embodiment of the present invention relates to a process wherein in step (a) and (c), the used plants/sea weeds contain sodium chloride and potassium chloride in the range of 20 to 60% by w/w.

Yet another embodiment of the present invention relates to a process wherein in step (a) and (c), the used plants/seaweeds used are edible in nature.

Yet another embodiment of the present invention relates to a process wherein in step (h), thus obtained salt have any color and naturally free flowing without any additives.

Yet another embodiment of the present invention relates to a process wherein thus obtained salt have white color and free flowing without any additives.

A further embodiment of the present invention relates to a homogeneous, free flowing and low content sodium salt obtained from botanical source comprises:
35 to 80% by w/w potassium chloride
20 to 30% by w/w sodium chloride
0.02 to 0.5% by w/w calcium
0.02 to 1.2% by w/w magnesium
0.0005 to 0.0007% by w/w iodine
rest are nutrients.

Still another embodiment of the present invention relates a sodium salt wherein the potassium chloride is obtained from *Eucheuma* plants.

Yet another embodiment of the present invention relates a sodium salt wherein the sodium chloride is obtained form *Salicornia* plants/sea weeds.

Yet another embodiment of the present invention relates a sodium salt wherein the crude salts are obtained from *Salicornia* plants and *Eucheuma* plants/sea weeds are mixed in a ratio in the range of 1:4 to 6:7.

Yet another embodiment of the present invention relates a salt wherein the used plants/seaweeds used are edible in nature.

Yet another embodiment of the present invention relates a salt wherein the salt have white color and naturally free flowing without any additives.

Yet another embodiment of the present invention relates a salt wherein the nutrients in salt are of zinc, iron and copper.

The present invention discloses the cost effective preparation of low sodium salt exclusively of vegetable origin and with desired proportions of sodium chloride and potassium chloride. For the present invention, a halophyte, *Salicornia brachiata*, whose tender tips are consumed as fresh salad, is used as the source of sodium chloride as disclosed in an earlier invention and a marine red alga, *Eucheuma*, which is a source of κ-carrageenan and documented as edible seaweed, is used as the source of potassium chloride. The plants also provide micronutrients such as iodine.

Halophytes are those plants, which can thrive on seawater/saline soils and produce biomass. Such plants are therefore, ideally suited for saline wasteland cultivation. The incentive for its cultivation would be high if attractive remuneration can be realized from the produce. The quantity of oil recovered from the seeds may not make its large-scale cultivation economically attractive on standalone basis. To increase the attractiveness, it would be essential to obtain a value added second product from the produce without affecting the quality and quantity of the first product. Also the latter product should also be equally marketable. Since 10–20 tons of waste biomass per hectare of cultivation is left after removal of seeds from the plant, 3–10 tons of common edible salt can be produced from this biomass since it contains 30–50% of salt.

Similarly, the red seaweed, *Eucheuma*, is the best source of κ-carrageenan. Cultivation of this seaweed is being done commercially in India and many other parts of the world. Immediately after harvesting, the seaweed material is sun dried at the coast itself. This dried material is used for carrageenan extraction. During drying, the material throws out salt, which is deposited, on its surface. This salt contributes to the dry weight of the material, which varies from 35% to 50% based on the site of cultivation (ecological conditions) and method of cultivation. Best raw material for carrageenan production has C/S ratio near 2, where C is the weight of clean anhydrous weed and S is the weight of soluble salt present in the weed. Before transporting the raw material, the raw material is thrashed to remove adhering salt to maximum level so as to reduce the weight of weed to make transportation economical and also to improve the C/S ratio. This salt was considered as a waste material as no attempts have been made to recover any important chemical from the same.

The significant ingenious steps involved in the present invention are:
1. Conceiving idea of preparation of micronutrient rich low sodium salt exclusively from plant source,
2. Preparation of such salt from the combination of common salt in the leftover biomass of *Salicornia brachiata* after removal of oil-bearing seeds and adhering waste salt in sun-dried *Eucheuma*, rich in potassium chloride
3. Maximizing returns to the farmers by obtaining an additional product from waste and thereby simultaneously solving the problem of waste disposal.
4. Producing such salt in a cost effective manner by utilizing the calorific value of biomass to ash the biomass so as to dispense with the problem of unwanted organics and color and at the same time sterilize the resultant salt.
5. Flexibly altering the ratio of potassium chloride to sodium chloride in low sodium salt by altering the proportions of raw materials subjected to incineration.
6. Producing low sodium salt that is naturally fortified with iodine and some other essential micronutrients.
7. Maximizing energy efficiency of salt production by minimizing volume of water for dissolution of salt from ash by taking advantage of the variation in the Invariant Point of the sodium chloride-potassium chloride-$H_2O$ system as a function of temperature.

The following examples are given by way of illustration and therefore and should not be construed to limit the scope of the present invention.

EXAMPLE 1

50 g of crude salt obtained from *Eucheuma* containing 22 g potassium chloride was uniformly mixed with 105 g *Salicornia* biomass containing 27 g sodium chloride and 3 g potassium chloride and the resulting mass was co-incinerated in a muffle furnace at 350° C. in static condition for 2 hours. This calcined material was dissolved in 200 ml of water under continuous stirring and at room temperature (30° C.). This solution was filtered by conventional techniques to remove suspending and insoluble materials, the filtrate was decolorized with charcoal and again filtered and the filtrate obtained was colorless. This clear solution was forced evaporated on a water bath. The solid residue was ground to fine size and then dried in an oven at 60° C. for 12 hours to obtain 44 g of creamish, free flowing low sodium salt containing 45% potassium chloride; 24% sodium chloride; 5% organic matter; 2.5% sulfate; 2.5% moisture; 0.4% calcium; 0.05% magnesium and 3 ppm of iodine and other traces of zinc, copper, and iron.

EXAMPLE 2

50 g of crude salt obtained from *Eucheuma* containing 22 g potassium chloride was uniformly mixed with 1.05 g *Salicornia* biomass containing 27 g sodium chloride and 3 g potassium chloride and the resulting mass was co-incinerated in a muffle furnace at 450° C. in static condition for 4 hours. This calcined material was dissolved in 200 ml of water under continuous stirring and at room temperature (30° C.). This solution was filtered by conventional techniques to remove suspending and insoluble materials, and the filtrate obtained was colorless. This clear solution was forced evaporated on a water bath. The solid residue was ground to fine size and then dried in an oven at 60° C. for 12 hours to obtain 48 g of white and free flowing low sodium salt containing 50% potassium chloride; 28% sodium chloride; 1.5% sulfate; 1.5% moisture; 0.31% calcium; 0.04% magnesium and 4 ppm of iodine and traces of zinc, copper, and iron.

EXAMPLE 3

125 g of crude salt obtained from *Eucheuma* containing 55 g potassium chloride was uniformly mixed with 100 g *Salicornia* biomass containing 25 g sodium chloride and 2.8 g potassium chloride and the resulting mass was co-incinerated in a muffle furnace at 450° C. in static condition for 4 hours. This calcined material was dissolved in 300 ml of water under continuous stirring and at room temperature (30° C.). This solution was filtered by conventional techniques to remove suspending and insoluble materials, and the filtrate obtained was colorless. This clear solution was forced evaporated on a water bath. The solid residue was ground to fine size and then dried in an oven at 60° C. for 12 hours to obtain 75 g of white and free flowing low sodium salt containing 66% potassium chloride; 30% sodium chloride; 1.1% sulfate; 1.5% moisture; 0.34% calcium; 0.07% magnesium and 2 ppm of iodine and traces of zinc, copper, and iron.

EXAMPLE 4

175 g of crude salt obtained from *Eucheuma* containing 77 g potassium chloride was uniformly mixed with 125 g *Salicornia* biomass containing 31 g sodium chloride and 3.3 g potassium chloride and the resulting mass was co-incinerated in a muffle furnace at 450° C. in static condition for 4 hours. This calcined material was dissolved in 300 ml of water under continuous stirring and at room temperature (60° C.). This solution was filtered by conventional techniques to remove suspending and insoluble materials, and the filtrate obtained was colorless. This clear solution was forced evaporated on a water bath. The solid residue was ground to fine size and then dried in an oven at 60° C. for 12 hours to obtain 75 g of white and free flowing low sodium salt containing 73% potassium chloride; 24% sodium chloride; 1.01% sulfate; 1.0% moisture; 0.33% calcium; 0.06% magnesium and 2 ppm of iodine and traces of zinc, copper, and iron.

ADVANTAGES OF THE INVENTION

Unlike other low sodium salts, this salt is obtained exclusively from plant source which is naturally rich in iodine and other micronutrients without fortification.

1. This is the first report in the world on preparation of low sodium salt from plant sources as an additional product without affecting the quality and quantity of first product.
2. Utilization of the leftover biomass of *Salicornia brachiata* after removal of oil-bearing seeds and adhering salt from sun-dried *Eucheuma* which is considered as waste material for the preparation of low sodium salt.
3. Maximizing returns to the farmers by obtaining an additional product from waste and thereby simultaneously solving the problem of waste disposal.
4. Utilization of conserved energy of the *Salicornia* biomass for co-incineration to yield crude low sodium salt free from organic matter and color without external input of energy.
5. Desired compositions of low sodium salt can be obtained with maximum energy efficiency, by integrating the processing of the crude salts from both the plants and taking advantage of the variation in the Invariant Point of the sodium chloride-potassium chloride-H$_2$O system as a function of temperature.
6. Up to 4 tons of nutrient rich low sodium salt can be obtained per hectare of cultivation of *Salicornia* and per 3 hectare of cultivation of *Eucheuma* with existing cultivation methods.
7. This health salt would be appealing to strict vegetarians since it is derived exclusively from vegetable sources.
8. This product also contains traces of beneficial micronutrients like calcium, magnesium, iron, copper, zinc and iodine without any fortification.
9. The product is white in color and naturally free flowing without any additives.

The invention claimed is:

1. A process for preparing a low sodium salt of vegetable origin, said process comprising the steps of:
   a) obtaining *Eucheuma* plants and drying the *Eucheuma* plants to a predetermined moisture level,
   b) either crushing, or hammering, or both crushing and hammering the dried *Eucheuma* plants produced in step (a) at room temperature for a period in the range of 10 to 30 minutes and separating adhered crude salt from the dried *Eucheuma* plants, the crude salt comprising 90–99% by w/w potassium chloride and traces of micronutrients,
   c) harvesting *Salicornia* plants, removing oil bearing seeds from the *Salicornia* plants, and drying the *Salicornia* plants to a predetermined moisture content,
   d) crushing the dried *Salicornia* plants produced in step (c) at room temperature and separating crude salt from the dried *Salicornia* plants, the crude salt comprising 20 to 60% by w/w sodium chloride and traces of micronutrients,
   e) mixing the crude salt obtained in step (d) with the crude salt of step (b) in a ratio in the range of 1:5 to 5:1 to form a crude salt mixture,
   f) incinerating the crude salt mixture obtained in step (e) at a temperature in the range 300° C. to 600° C. for a period of 1 to 10 hours to obtain an incinerated mixture comprising a crude low sodium salt devoid of organic matter,
   g) dissolving the incinerated mixture produced in step (f) in water and preparing a salt solution, and
   h) filtering the salt solution produced in step (g) and concentrating the resulting salt solution to obtain the low sodium salt of vegetable origin.

2. A process as claimed in claim 1 wherein in step (a), the *Eucheuma* plants are 45 to 90 days old.

3. A process as claimed in claim 1 wherein in step (a), the predetermined moisture level is 20 to 25%.

4. A process as claimed in claim 1 wherein in step (b), the crude salt comprises 90 to 99% potassium chloride, 0.1 to 2% sodium chloride and traces of micronutrients.

5. A process as claimed in claim 1 wherein in step (c), the *Salicornia* plants are 45 to 90 days old.

6. A process as claimed in claim 1 wherein in step (d), the micronutrients comprise calcium, magnesium, iron, copper and zinc.

7. A process as claimed in claim 1 wherein in step (e), the crude salt of step (d) and the crude salt of step (b) are mixed in a ratio in the range of 1:4 to 6:7.

8. A process as claimed in claim 1 wherein in step (g), the dissolution of the incinerated mixture in water is carried out under continuous stirring for a period in the range of 30 minute to 2 hours and at a temperature in the range of 10° C. to 110° C. to obtain 15 to 35% of salt concentration.

9. A process as claimed in claim 1 wherein in step (h), the low content sodium salt of vegetable origin comprises 35 to 80% by w/w potassium chloride, 20 to 30% by w/w sodium chloride, 0.02 to 0.5% calcium, 0.02 to 1.2% by w/w magnesium, 5 to 10 ppm of iodine, and traces of zinc, iron and copper.

10. A process as claimed in claim 1 wherein in step h), concentration of the resulting salt solution is carried out in an evaporator.

11. A process as claimed in claim 9, wherein the low content sodium salt of vegetable origin comprises iodine in the range of 5 to 7 ppm.

12. A process as claimed in claim 1, wherein in step (a) the *Eucheuma* plants comprise potassium chloride in the range of 20 to 60% by w/w, and in step (c), the *Salicornia* plants comprise sodium chloride in the range of 20 to 60% by w/w.

13. A process as claimed in claim 1, wherein the *Eucheuma* plants and the *Salicornia* plants are edible.

14. A process as claimed in claim 13, wherein the low sodium salt of vegetable origin has a white color and is free flowing without any additives.

15. The method of claim 1 in which:
in step (a), the *Eucheuma* plants are 45 to 90 days old;
in step (a), the predetermined moisture level is 20 to 25%;
in step (b), the crude salt comprises 90 to 99% potassium chloride and 0.1 to 2% sodium chloride;
in step (c), the *Salicornia* plants are 45 to 90 days old;
in step (d), the micronutrients comprise calcium, magnesium, iron, copper and zinc;
in step (e), the crude salt of step (d) and the crude salt of step (b) are mixed in a ratio in the range of 1:4 to 6:7; and
in step (h), the low sodium salt of vegetable origin comprises 35 to 80% by w/w potassium chloride, 20 to 30% by w/w sodium chloride, 0.02 to 0.5% calcium, 0.02 to 1.2% by w/w magnesium, 5 to 10 ppm of iodine, and traces of zinc, iron and copper.

* * * * *